(12) United States Patent
Schulz et al.

(10) Patent No.: US 7,871,137 B2
(45) Date of Patent: Jan. 18, 2011

(54) SWITCHGEAR ENCLOSURE DOOR SEAL

(75) Inventors: Richard Schulz, Clayton, NC (US);
Bernd Schmidt, Apex, NC (US);
Martin Eiselt, Raleigh, NC (US)

(73) Assignee: Siemens Energy, Inc., Orlando, FL (US)

( * ) Notice: Subject to any disclaimer, the term of this patent is extended or adjusted under 35 U.S.C. 154(b) by 377 days.

(21) Appl. No.: 12/056,368

(22) Filed: Mar. 27, 2008

(65) Prior Publication Data

US 2009/0173118 A1     Jul. 9, 2009

Related U.S. Application Data

(60) Provisional application No. 61/019,438, filed on Jan. 7, 2008.

(51) Int. Cl.
*A47B 95/00*     (2006.01)
(52) U.S. Cl. ..................................................... 312/296
(58) Field of Classification Search ................. 312/296, 312/326–329; 49/383, 381
See application file for complete search history.

(56) References Cited

U.S. PATENT DOCUMENTS

| | | | | |
|---|---|---|---|---|
| 4,815,237 A | * | 3/1989 | Dizon et al. | ................... 49/383 |
| 4,864,466 A | * | 9/1989 | Gasparetto | ................... 312/215 |
| 5,905,244 A | | 5/1999 | Smith et al. | |
| 5,971,515 A | * | 10/1999 | Baker et al. | ................. 312/329 |
| 6,561,604 B2 | | 5/2003 | Leccia et al. | |
| 6,746,092 B2 | | 6/2004 | Leccia et al. | |
| 6,959,972 B2 | * | 11/2005 | Cude et al. | ................... 312/329 |
| 6,971,322 B2 | * | 12/2005 | DuBois et al. | ............... 312/216 |
| 7,140,702 B2 | * | 11/2006 | Byron et al. | ................. 312/296 |
| 7,236,352 B2 | * | 6/2007 | Dalis | ........................... 361/608 |
| 7,404,363 B2 | * | 7/2008 | Dunstan | ...................... 49/254 |
| 7,654,404 B2 | * | 2/2010 | Kadziolka et al. | ............ 220/211 |

FOREIGN PATENT DOCUMENTS

| | | |
|---|---|---|
| DE | 2243263 | 3/1974 |
| DE | 3940500 A1 | 6/1991 |
| FR | 891126 | 2/1944 |

OTHER PUBLICATIONS

English translation of DE 3940500 A1.

* cited by examiner

*Primary Examiner*—Hanh V Tran (57) ABSTRACT

A seal for a switchgear enclosure is described. The switchgear enclosure includes a case having an opening defined by a face frame the face frame having an inner frame surface along a face frame hinge side and a door for covering the opening. The door includes a door inner surface and a door hinge side pivotally attached to the face frame along the face frame hinge side. The seal includes a sealing member disposed along the door hinge side of the door adjacent the door inner surface and configured for movement substantially perpendicular to the door hinge side between a disengaged position and an engaged position. The sealing member comprises a flange for overlapping at least a portion of an inner surface of the face frame along the face frame hinge side when in the engaged position.

14 Claims, 9 Drawing Sheets

SWITCHGEAR ENCLOSURE DOOR SEAL

This application claims benefit under 35 USC 119(e)(1) of the Jan. 7, 2008 filing date of U.S. provisional application 61/019,438, incorporated by reference herein.

FIELD OF THE INVENTION

The present invention relates to arc resistant metal enclosures for switchgear, and more particularly, to a seal for a switchgear enclosure door.

BACKGROUND OF THE INVENTION

Metal enclosures are commonly used to house medium voltage switchgear operating at voltages of from 5 to 38 KV. Such enclosures are typically designed to withstand increased gas pressure generated during an arcing event that acts on an interior of the enclosure. Switchgear enclosures typically include one or more doors for allowing access to an interior of the enclosure for ease in servicing and maintaining the switchgear housed inside. Such doors are designed to withstand the increased gas pressure generated during an arcing event and limit arcing products and hot gases from escaping the enclosure. A typical enclosure door may overlap a face frame of an opening of the enclosure when closed and include a one or more hinges along a hinged side of the door and one or more latches that engage the face frame along edges of the other three sides of the door. Improved door latching mechanisms for containing arc-induced gas pressures in such switchgear enclosures are desired.

BRIEF DESCRIPTION OF THE DRAWINGS

The invention is explained in the following description in view of the drawings that show.

DETAILED DESCRIPTION OF THE INVENTION

Figure 1:
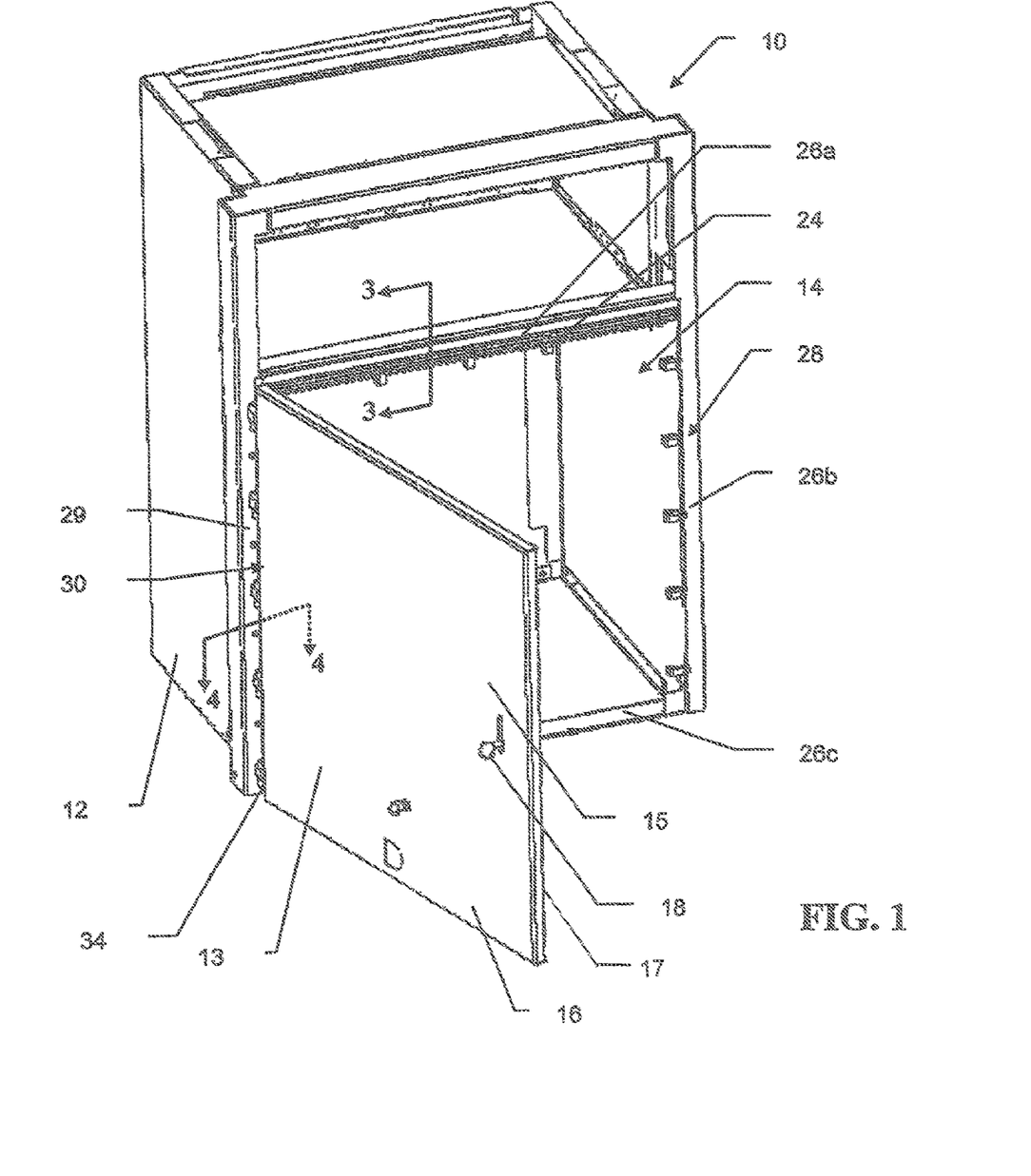
FIG. 1 is a perspective view of a switch gear enclosure having a partially opened door.
Figure 2:
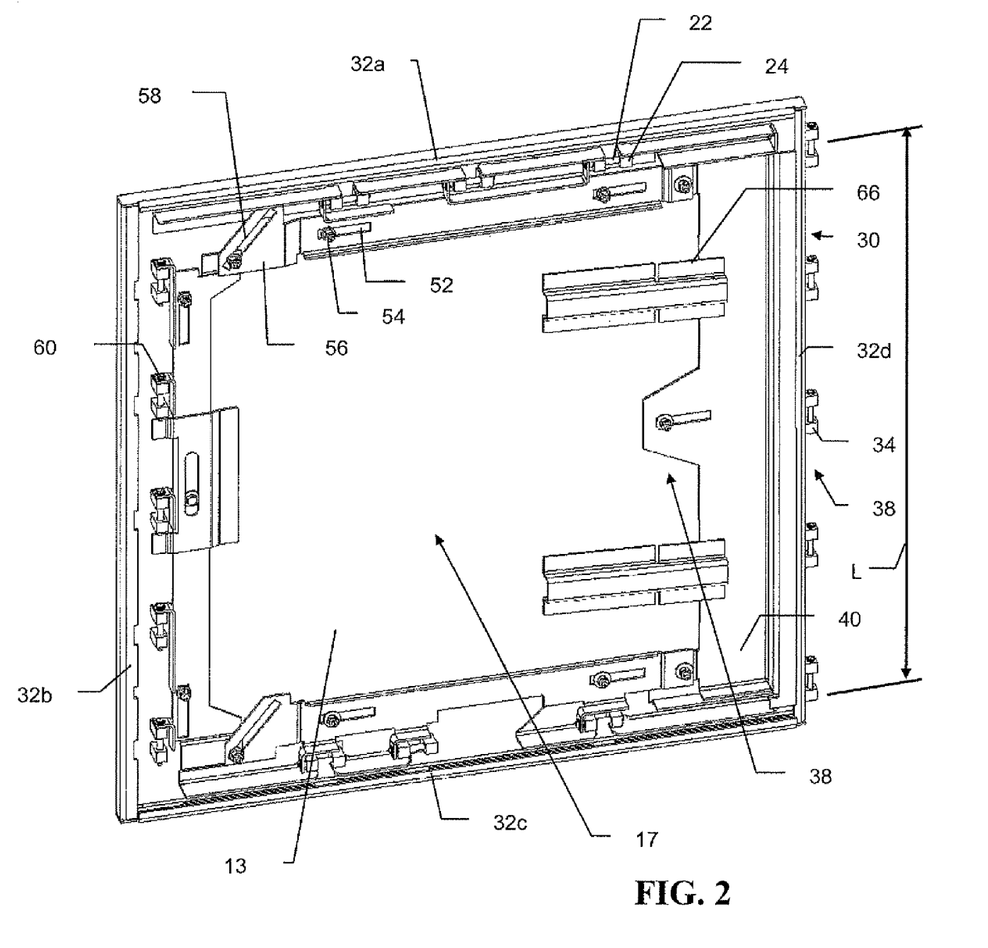
FIG. 2 is a perspective view of an inner side of the door of FIG. 1.

In an example embodiment of the invention shown in FIGS. 1 and 2, a switchgear enclosure 10 includes a case 12 having an opening 14 defined by a face frame 28. The enclosure 10 includes a door 16 for selectively covering the opening 14. The door 16 may include a door panel 13 and a handle 18 at a door outer surface 15 that operates a mechanism 48 at a door inner surface 17 for extending pins 22 into receivers 24 attached to one or more face frame outer surfaces 26a-c of the face frame 28 of the case 12. This arrangement, in combination with a door hinge side 30 of the door 16, securely latches the door 16 closed and forms a seal between the door edges 32a-d and the face frame 28 to limit escape of arcing products and hot gases from within the enclosure 10. As shown in FIG. 1, the receivers 24 may be attached to the face frame 28 of the case 12 inboard of one or more door edges 32a-c of the door 16. Hinges 34 on the door hinge side 30 may be disposed outboard of the door edge 32d so as to allow the door 16 to be swung to an open position.

Figure 3:
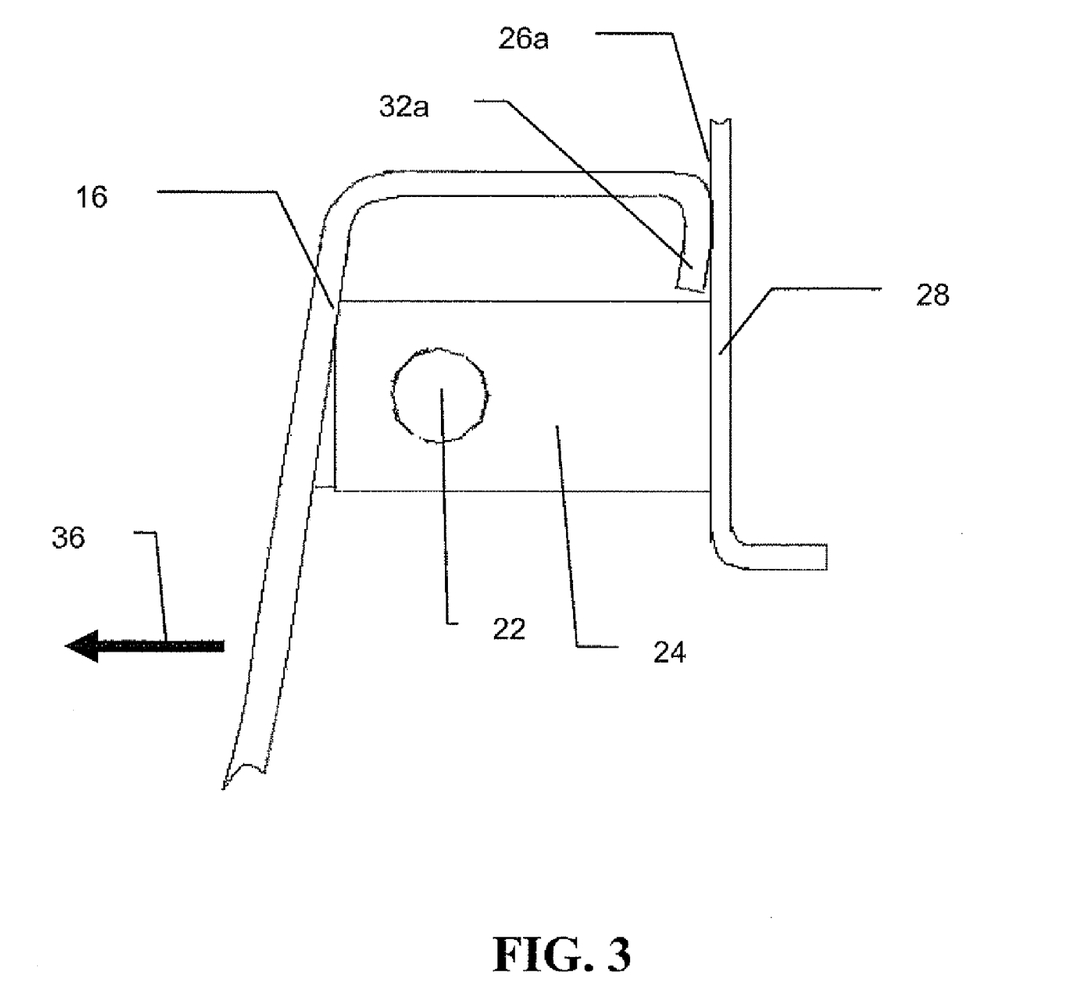
FIG. 3 is partial cross-sectional view taken along lines 3-3 of FIG. 1 when the enclosure door is closed.
Figure 4:
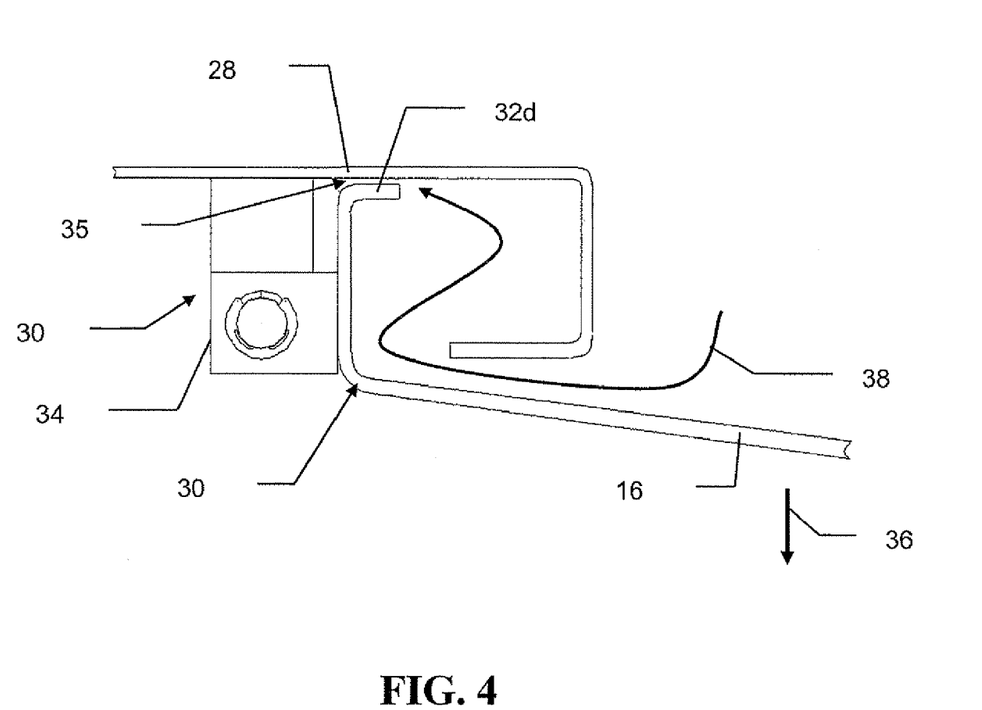
FIG. 4 is partial cross-sectional view taken along lines 4-4 of FIG. 1 when the enclosure door is closed.

As depicted in FIGS. 3 and 4, the inventors have realized that the increased gas pressure generated during an arcing event inside the enclosure 10 may act to outwardly distort (as indicated by arrow 36) the door 16 so that the latched receivers 24 and pins 22 act as pivot points inboard of the edges 32a-c of the door 16. Consequently, these inboard mounted latched receivers 24 act to force the edges 32a-c of the door 16 against the outer surfaces 26a-c of the face frame 28, advantageously resulting in a tighter seal between the edges 32a-c and the face frame 28. However, as depicted in FIG. 4, the inventors have also realized that the hinges 34 on the door hinged side 30 of the door 16 act as pivot points outboard of the edge 32d of the door 16. The outboard mounting of the hinges 34 allows the edge 32d of the door 16 on the door hinge side 30 to move outwardly (as indicated by arrow 36) away from the face frame 28 on a face frame hinge side 29 during an arcing event. A resulting gap 35 between the edge 32d of the door 16 and the face frame 28 may allow arc generated products and gases (e.g., indicated by arrow 38) from inside the enclosure 10 to escape there between. To help seal this gap 35, the inventors have developed an innovative movable seal 38 (for example, as shown in FIG. 2) that seals the door 16 to the face frame 28 along the hinged side 30 when an arcing event occurs.

Figure 5:
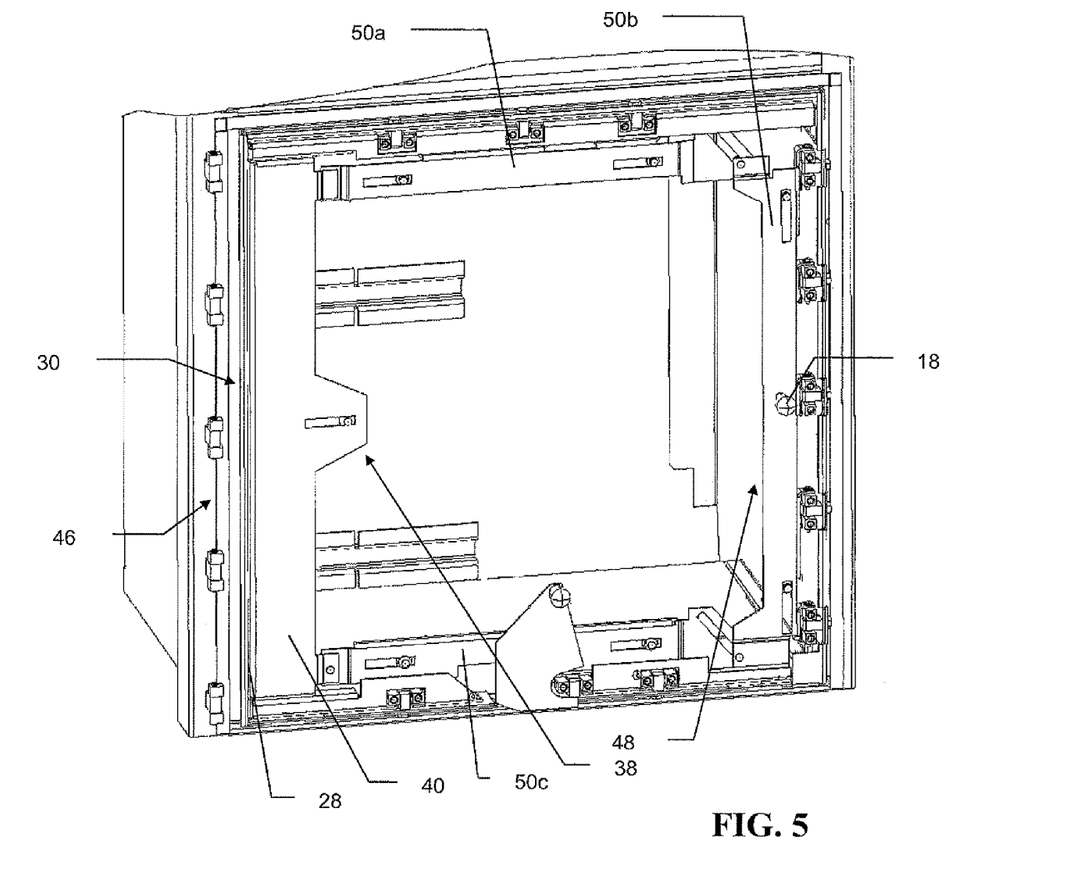
FIG. 5 is a perspective view of the switch gear enclosure showing a door panel removed and a seal associated with the door in an engaged position.
Figure 6:
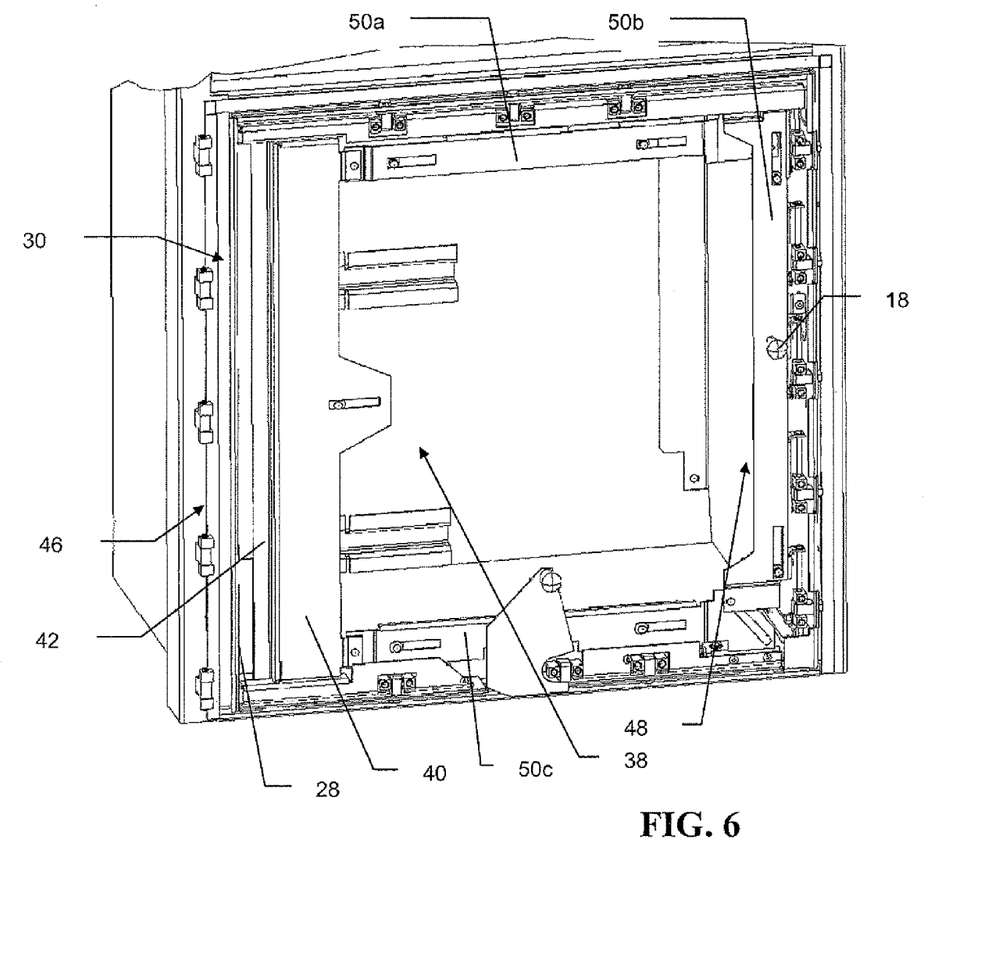
FIG. 6 is a perspective view of the switch gear enclosure showing the door panel removed and a seal associated with the door in a disengaged position.

As depicted in FIGS. 5 and 6, the seal 38 includes a sealing member 40 disposed along the door hinge side 30 of the door 16 against the door inner surface 17. The sealing member 40 may be configured for movement substantially perpendicular to the door hinge side 30 between a disengaged position as shown in FIG. 6 and an engaged position shown in FIG. 5. For example, the sealing member 40 may be configured for sliding movement, such as along the door inner surface 17 of the door 16 (as shown in FIG. 2) between the disengaged position and the engaged position.

Figure 7:
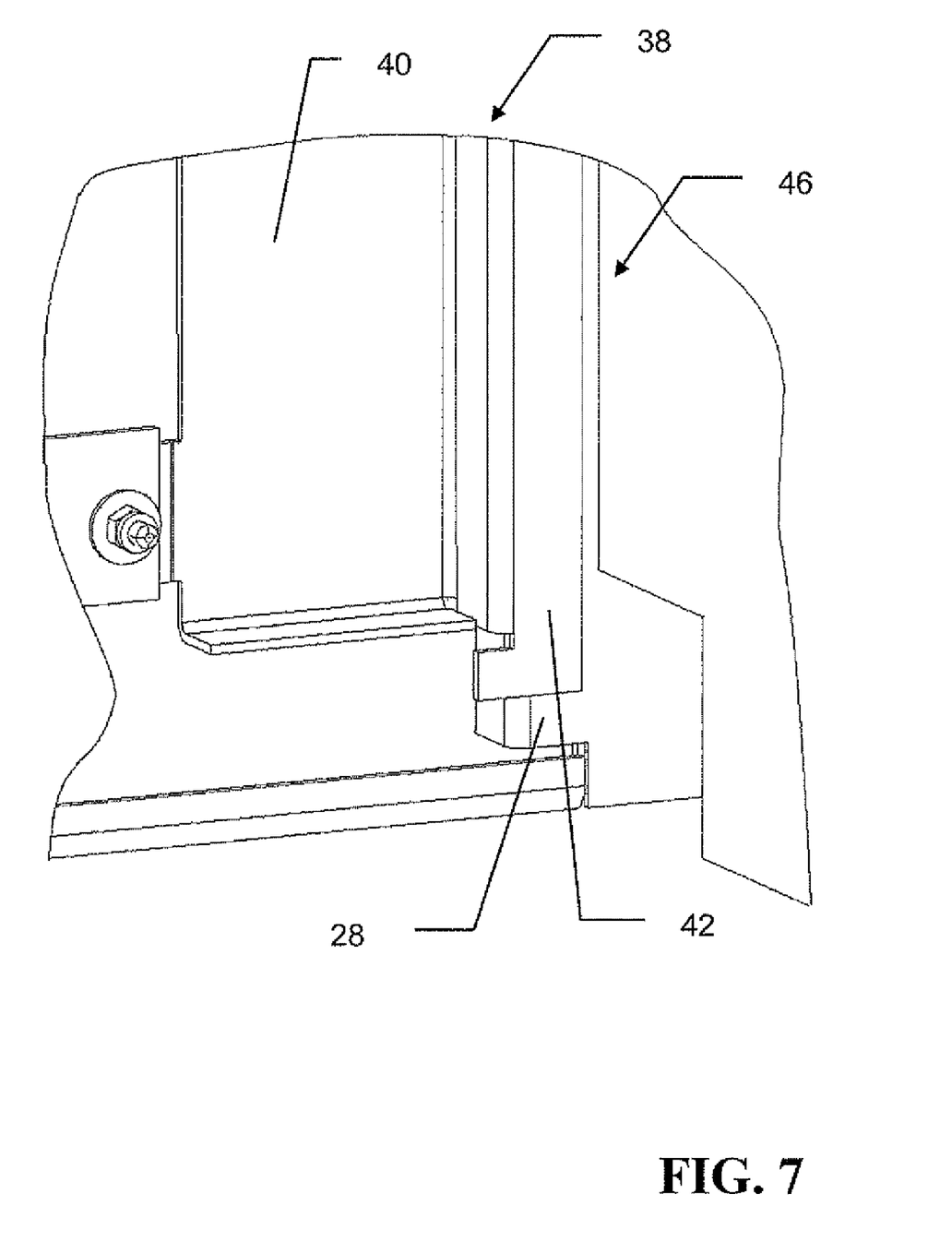
FIG. 7 is a partial perspective interior view of the switch gear enclosure showing a detail of the seal in the engaged position.
Figure 8:
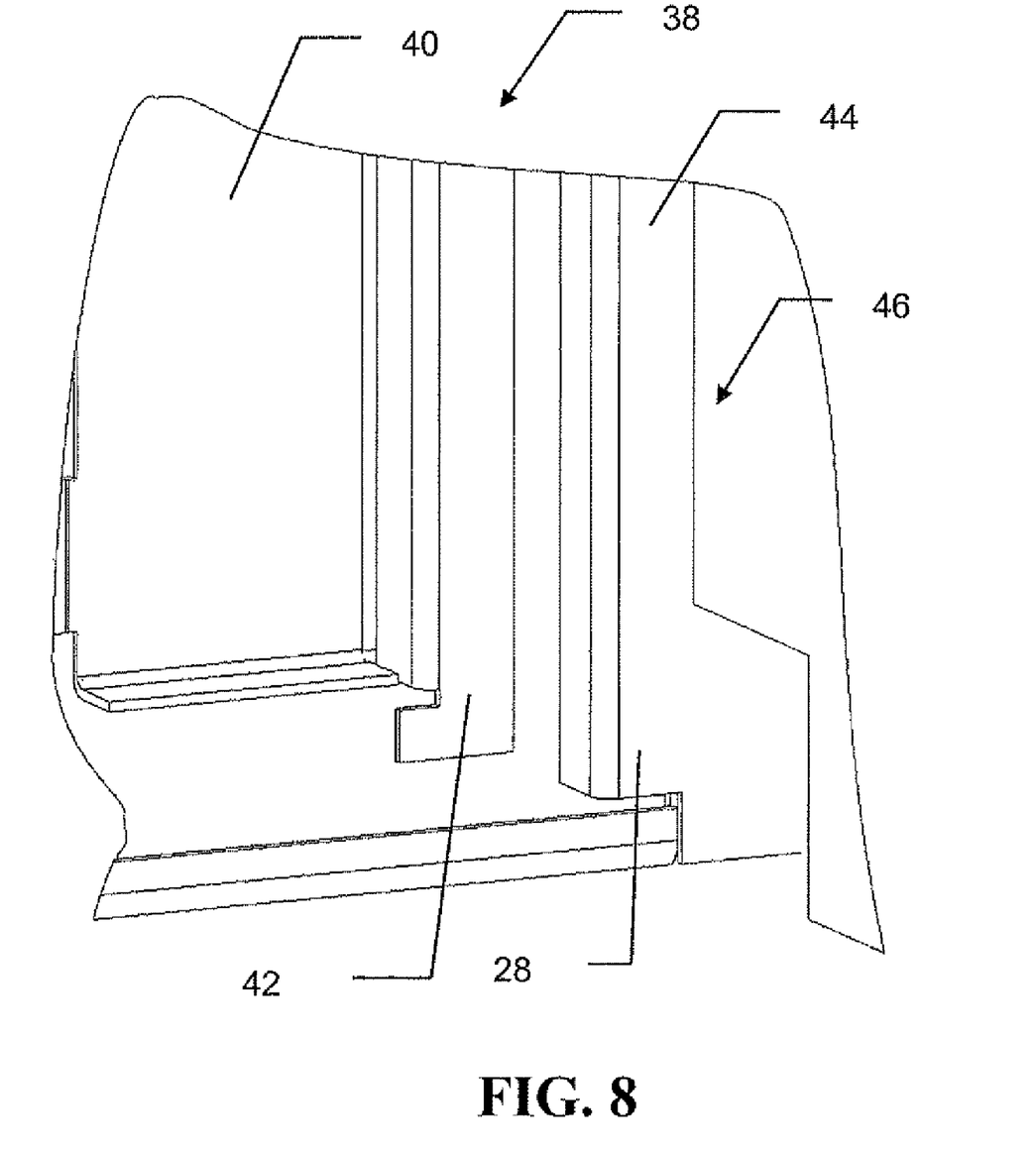
FIG. 8 is a partial perspective interior view of the switch gear enclosure showing a detail of the seal in the disengaged position.
Figure 9:
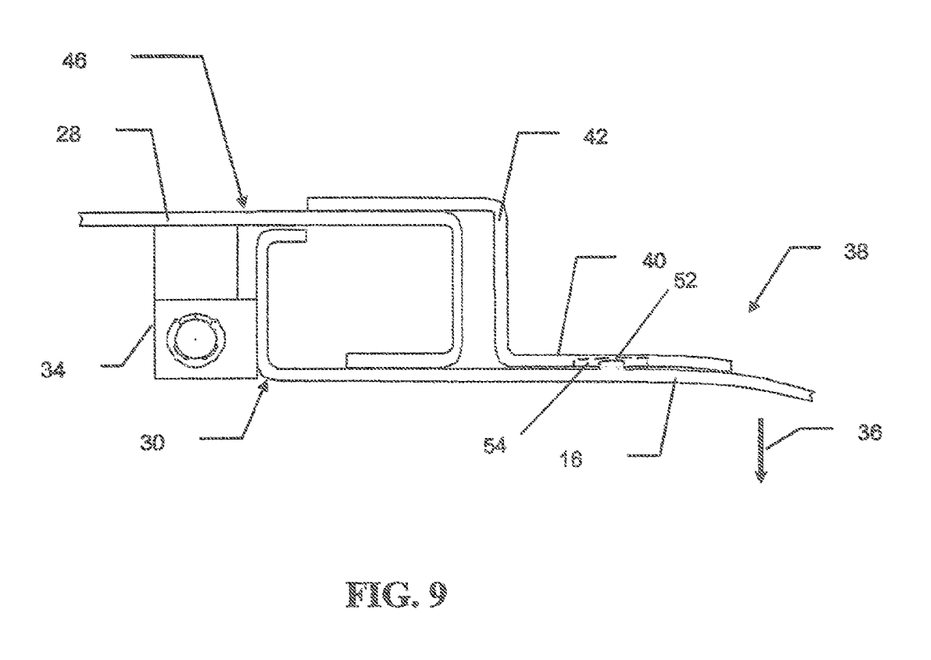
FIG. 9 is partial cross-sectional view taken along lines 4-4 of FIG. 1 when the enclosure door is closed with the seal in the engaged position.

As shown in FIGS. 7 and 8, the sealing member 40 may comprise a flange 42 for overlapping at least a portion 44 of an inner frame surface of the face frame 28 along the face frame hinge side 46 when in the engaged position. As shown in FIG. 9, the flange 42 may be configured to be forced against the portion 44 of the inner frame surface along the face frame hinge side 46 when the door 16 is forced away from the case 12 such as during an arcing event inside the enclosure 10. Consequently, the flange 42 acts to seal against the inner frame surface along the face frame hinge side 46 to limit escape of arc generated products and gases from inside the enclosure 10 during an arcing event. As shown in FIG. 2, the flange 42 may be configured to continuously extend substantially along a length L of the door hinge side 30. In another aspect depicted in FIG. 2, the door sealing member 40 may include one or more slots 52 receiving a corresponding post 54 attached to the door 16 therein to at least partially control a direction of sliding movement of the sealing member 40.

As shown in FIGS. 2, 5, and 6, the seal 38 may include a mechanism 48 for moving the sealing member 40 between the disengaged position and the engaged position. In an example embodiment, the mechanism 48 may include one or more positioning members 50a-c configured for moving the seal 38 between the engaged and the disengaged position, for example, responsive to movement of the handle 18. In another example embodiment, the positioning members 50a-c may be disposed along respective door edges 32a-c and include one or more slots 52 receiving corresponding posts 54 attached to the door 16 therein to at least partially control a direction of sliding movement of the positioning members 50a-c. In yet another example embodiment, positioning member 50b may include posts 56 for engaging respective slots in members 50a, 50c, wherein a corresponding slot/post arrangement may be configured for transferring vertical movement of the member 50b to horizontal movement of members 50a, 50c. For example, slots 58 may extend longitudinally at about a 45 degree angle with respect to a direction of movement of member 50b and/or directions of movement of members 50a, 50c. In another example embodiment, the members 50a-50b may include pin extensions 60 for selectively extending pins 22 attached thereto into and out of corresponding receivers 24. The door sealing mechanism 48 may further include a door stiffener extension 66 that at least partially overlaps a portion of the sealing member 40 to at least partially guide sliding movement of the sealing member 40 between the extension 66 and the door inner surface 17.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A door for attachment to a switchgear enclosure, the switchgear enclosure including a case having an opening defined by a face frame, the face frame having an inner frame surface along a face frame hinge side, the door comprising:
    a door inner surface having a plurality of posts extending therefrom,
    a door hinge side configured to be pivotally attached to the face frame along a face frame hinge side of the enclosure, and
    a sealing member disposed along the door hinge side of the door adjacent the door inner surface and configured for movement between a disengaged position and an engaged position, the sealing member comprising a flange for overlapping at least a portion of an inner surface of the face frame along the hinged side when in the engaged position so that the flange is forced against the inner surface of the face frame along the hinged side when the door is forced away from the case during an arcing event inside the enclosure;
    wherein the sealing member comprises a plurality of positioning members disposed along at least three respective edges of the door inner surface;
    wherein each of the plurality of positioning members comprises one or more slots for receiving corresponding ones of the plurality of posts extending from the door inner surface to at least partially control a direction of movement of the positioning members.

2. The door of claim 1, further comprising a mechanism for moving the sealing member between the disengaged position and the engaged position.

3. The door of claim 2, further comprising a door stiffener extension configured for at least partially overlapping a portion of the sealing member effective to at least partially guide movement of the sealing member between the extension and the door inner surface.

4. The door of claim 1, wherein the sealing member is configured for sliding movement along the door inner surface between the disengaged position and the engaged position.

5. The seal of claim 1, wherein the flange is configured for continuously extending substantially along a length of the door hinge side.

6. The door of claim 1, wherein the plurality of positioning members comprise a vertical positioning member oriented between a pair of horizontal positioning members, wherein the vertical positioning member comprises posts for engaging respective slots in the pair of horizontal positioning members to transfer vertical movement of the vertical positioning member to horizontal movement of the horizontal positioning members.

7. The enclosure of claim 6, wherein the slots of the pair of horizontal positioning members are oriented at an angle of 45° relative to a direction of movement of the vertical positioning member.

8. A switchgear enclosure comprising:
    a case having an opening defined by a face frame, the face frame having an inner frame surface along a face frame hinge side;
    a door for covering the opening comprising:
    a door inner surface having a plurality of posts extending therefrom;
    an outer side;
    a door hinge side pivotally attached to the face frame along a face frame hinge side of the enclosure,
    a sealing member disposed along the door hinge side of the door adjacent the door inner surface and configured for horizontal movement between a disengaged position and an engaged position, the sealing member comprising a flange for overlapping at least a portion of an inner surface of the face frame along the hinged side when in the engaged position so that the flange is forced against the inner surface of the face frame along the hinged side when the door is forced away from the case during an arcing event inside the enclosure;
    wherein the sealing member comprises a plurality of positioning members disposed along at least three respective edges of the door inner surface;
    wherein each of the plurality of positioning members comprises one or more slots for receiving corresponding ones of the plurality of posts extending from the door inner surface to at least partially control a direction of movement of the positioning members.

9. The enclosure of claim 8, further comprising a mechanism for moving the sealing member between the disengaged position and the engaged position.

10. The enclosure of claim 9, further comprising a door stiffener extension configured for at least partially overlapping a portion of the sealing member effective to at least partially guide movement of the sealing member between the extension and the door inner surface.

11. The enclosure of claim 8, wherein the sealing member is configured for sliding movement along the door inner surface between the disengaged position and the engaged position.

12. The enclosure of claim 8, wherein the flange is configured for continuously extending substantially along a length of the door hinge side.

13. The enclosure of claim of 8, wherein the plurality of positioning members comprise a vertical positioning member oriented between a pair of horizontal positioning members, wherein the vertical positioning member comprises posts for engaging respective slots in the pair of horizontal positioning members to transfer vertical movement of the vertical positioning member to horizontal movement of the horizontal positioning members.

14. The enclosure of claim 13, wherein the slots of the pair of horizontal positioning members are oriented at an angle of 45° relative to a direction of movement of the vertical positioning member.

* * * * *